Sept. 25, 1945.　　　　L. W. RUSSELL　　　　2,385,587
NIBBLER
Filed Sept. 27, 1944　　　　2 Sheets-Sheet 1
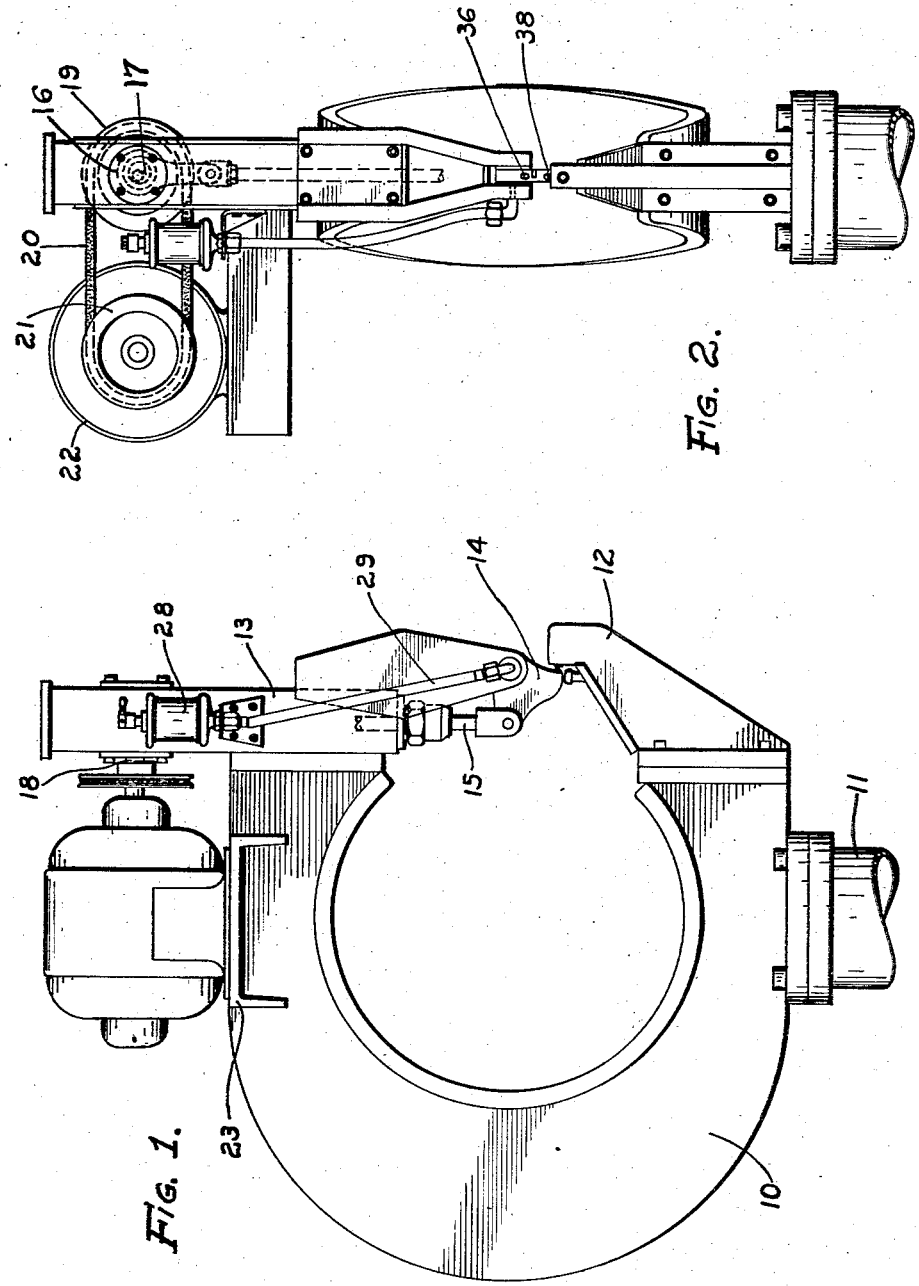
INVENTOR.
LESLIE W. RUSSELL
BY
ATTORNEY.

Sept. 25, 1945.    L. W. RUSSELL    2,385,587
NIBBLER
Filed Sept. 27, 1944    2 Sheets-Sheet 2

INVENTOR.
LESLIE W. RUSSELL
BY *E. Woodbury*
ATTORNEY.

Patented Sept. 25, 1945

2,385,587

UNITED STATES PATENT OFFICE 2,385,587

NIBBLER

Leslie W. Russell, San Diego, Calif., assignor to Solar Aircraft Company, San Diego, Calif., a corporation of California Application September 27, 1944, Serial No. 555,975

7 Claims. (Cl. 164—47)

This invention relates to power operated shears of the type commonly referred to as nibblers because they employ very short shearing knives reciprocated very rapidly to make a series of short cuts in rapid succession.

An object of the invention is to provide a nibbler capable of working on work sheets of such shape that they cannot be received in a conventional nibbler. More specifically, it is an object to provide a nibbler in which both cutting elements are of relatively limited dimensions in the cutting plane so that the machine can handle non-planar work sheets.

Another object is to provide a simple and practical nibbler construction that can be easily adjusted and operated.

Still another object is to provide a nibbler of minimum dimensions in the shearing plane.

Conventional nibblers comprise a C frame having upper and lower heads much the same as a sewing machine with a fixed shear mounted on one of the heads and a reciprocating shear mounted on the other head for engagement with the fixed shear, the shearing plane usually being vertical and extending through the upper and lower heads. Such an arrangement is perfectly satisfactory with flat sheets but not with sheets having bends of such a nature that a portion of the workpiece remote from the portion being sheared lies in the shearing plane. Unfortunately, however, there are numerous workpieces of non-planar shape such that the heads of the conventional nibbler prevent positioning of the work therein because of interference between the workpiece and one or both of the heads.

In accordance with the present invention, the fixed and movable shears are mounted so that the shearing plane is at an angle, preferably a large angle, to an axis interconnecting the two heads. Furthermore, the shears themselves are made of relatively limited dimensions in the shearing plane so that they can receive curved workpieces of relatively small radius of curvature without interference.

To achieve limited dimensions of the movable shear, the latter is mounted on the outer end of a rocker arm having a pivotal axis parallel to but spaced from the shear plane. The rocker arm can then be oscillated in any desired manner for applying the proper movement to the shear mounted thereon.

A full understanding of the invention may be had from the following detailed description of a particular embodiment disclosed in the drawings, in which:

Fig. 1 is a side elevation of a machine incorporating my invention;

Fig. 2 is a front elevation of the machine;

Figure 3:
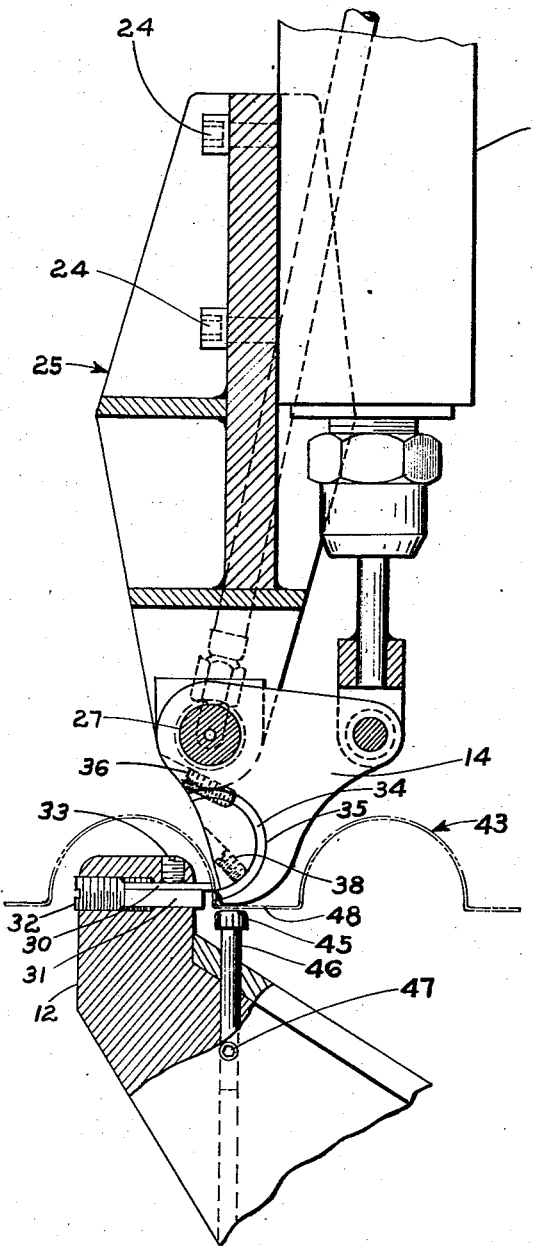
Fig. 3 is a detail vertical section through a portion of the machine.
Figure 4:
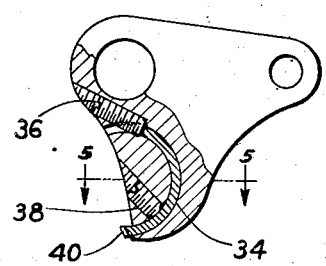
Fig. 4 is a detail view partly in section of the rocker member of the machine.
Figure 5:
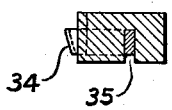
Fig. 5 is a detail section in plane 5—5 of Fig. 4.

Referring to Figs. 1 and 2, the nibbler depicted comprises a C frame 10 supported by a standard 11 and carrying a lower head 12 and an upper head 13. The lower head 12 carries a stationary cutter to be described later and the upper head carries a rocker member 14 which supports and moves the movable cutter. The rocker member 14 is oscillated by a vertical connecting rod 15 extending from the lower end of the head 13 which is hollow and contains an eccentric collar 16 engaged by an eccentric 17 on a crank shaft 18 which is journaled in the opposite walls of the head 13. A pulley 19 is mounted on the rear end of the crank shaft and is coupled by a belt 20 to a pulley 21 on an electric motor 22 supported on a shelf 23 extending laterally from the C frame 10. The mechanism described for reciprocating the rod 15 is of conventional design and its operation is obvious.

Referring now to Figs. 2 and 3, there is secured to the front of the head 13, by bolts 24, a bracket 25 which is bifurcated at the lower end for receiving therebetween the rocker member 14. The rocker member and the bracket 25 are provided with journals for receiving a pivot pin 27 which oscillatably supports the rocker member 14. An oil cup 28 and an oil line 29 are provided for lubricating the rocking bearing.

Referring to Fig. 3, it will be observed that the lower head 12 has a horizontal recess for receiving a horizontal fixed cutter 30 and a spacer bar 31 mounted thereunder. An adjusting screw 32 is screwed into a threaded aperture provided therefor at the forward end of the cutter to serve as an adjustable backing element therefor. A lock screw 33 serves to lock the cutter 30 and the spacer bar 31 in desired position. It will be observed that the right end of the cutter 30 extends slightly beyond the right end of the spacer bar 31 and its lower front edge constitutes a shearing edge cooperating with the movable cutter.

The movable cutter 34 is arcuate in shape and is mounted in an arcuate groove 35 provided in the rocker member 14 and opening to the front side thereof as viewed in Fig. 3. The arcuate cutter 34 is backed by an adjusting screw 36 screwed into a threaded recesss adjacent the upper end of the arcuate groove 35 and is locked in adjusted position by a set screw 38. It will be observed that the head ends of both the adjusting screw 36 and the lock screw 38 are accessible from the front of the machine.

The arcuate groove 35 is so located in the rocker arm 14 that when the lower end of the cutter 34 is projected slightly from the groove, its upper leading edge which cooperates with the lower edge of the fixed cutter 30 is substantially tangent to a circle having its radius at the axis of the rocker member.

Obviously since the shearing edge 40 of the movable cutter moves in a curved path, it cannot move truly parallel to the under side of the fixed cutter 30. However, the stroke of the movable cutter is so small compared to its radius of oscillation that the discrepancy is negligible.

As the movable cutter becomes dull in use, it can readily be re-sharpened by grinding off the end and then readjusted to bring the edge to normal working position by loosening the set screw 38 and turning the backing screw 36.

One type of special workpiece that the present machine is adapted to cut is shown at 43 in Fig. 3. It will be observed that this workpiece comprises two sections semi-circular in shape, interconnected by a common flange and it is desired to cut off each circular section closely adjacent the flange. Such an operation would be impossible in a conventional nibbling machine because the side of the semi-circular section opposite to that being cut would interfere with the head structures of the standard machine.

However, it will be observed from Fig. 3 that the limited dimension of the stationary cutter and its associated head in the plane of the cut permits one semi-circular section of the workpiece to fit around it. Likewise the limited dimension of the lower end of the rocker member 14 in the shearing plane permits the latter to enter between the two semi-circular sections of the workpiece. One thing that contributes substantially to the limited dimension of the rocker member in the shearing plane is the use of the arcuate cutter 34.

There is shown on the lower head 12 an adjustable rest 45 having a shank or spindle 46 slidable in a hole provided therefor in the head 12 and adapted to be locked in a desired position with a set screw 47. By adjusting the rest 45 to the proper height, the particular workpiece shown can be supported thereby as it is moved between the shears so as to make a smooth cut at a desired distance from the flange 48 of the workpiece.

Although for the purpose of explaining the invention a specific embodiment thereof has been described in substantial detail, various departures from the exact construction shown can be made without departing from the invention which is to be limited only to the extent set forth in the appended claims.

I claim:

1. A nibbler comprising: a frame; a stationary cutter and means for supporting it in fixed relation on said frame; a rocker member and means pivotally supporting it on said frame for rocking motion; a movable cutter supported on said rocker member adjacent said stationary cutter in shearing engagement therewith in a horizontal shearing plane; and means for rocking said rocker member to rock said movable cutter into and out of shearing engagement with said stationary cutter.

2. A nibbler comprising: a frame; a stationary cutter and means for supporting it in fixed relation on said frame; a rocker member and means pivotally supporting it on said frame for rocking motion; a movable cutter supported on said rocker member adjacent said stationary cutter; means for rocking said rocker member to rock said movable cutter into and out of cutting engagement with said stationary cutter, in which said movable cutter is arcuate in shape and said rocker member has an arcuate recess for receiving the arcuate cutter; an adjustable backing element on said rocker member adapted to bear against the rear end of said arcuate cutter for adjustably advancing it in said recess; and means for securing said cutter in a desired position of adjustment in said recess.

3. A nibbler comprising: a vertical frame having a lower head and an upper head spaced above said lower head; a horizontal fixed cutter on one of said heads; a rocker member pivotally mounted on the other of said heads and means for rocking it, said rocker member having a narrow outer tip portion juxtaposed to the end of the stationary cutter and movable toward and away therefrom when said member rocks, said rocker member having an arcuate recess therein, both ends of which open into the same face of said member; an arcuate cutter element in said recess having one end projecting from the recess for shearing engagement with said stationary cutter; and means for securing said arcuate cutter element in said arcuate recess.

4. A nibbler as described in claim 3 in which said arcuate cutter element is shorter than said arcuate recess, and adjusting means movable in the other end of said recess adapted to bear against the other end of said cutter element for adjustably projecting said one end of the cutter element from said one end of the recess.

5. A nibbler comprising: a frame having a pair of vertically spaced cutter-supporting heads; a stationary cutter element mounted on the lower of said heads; an oscillating cutter element mounted on the upper one of said heads and adapted to move in shearing relation with respect to said stationary cutter in a horizontal shearing plane, said oscillating cutter element comprising an arm pivotally supported on said other head at a point spaced above said shearing plane and having its cutting edge adjacent the end of the arm remote from the pivot axis thereof, whereby the dimension of that portion of the arm within said shearing plane can be made small.

6. A nibbler comprising: a frame; a stationary cutter and means for supporting it in fixed relation on said frame; a rocker member and means pivotally supporting it on said frame for rocking motion; a cutter supported on said rocker member with one end edge thereof in shearing relation with said stationary cutter; and means for rocking said rocker member to rock said movable cutter into and out of shearing engagement with said stationary cutter, in which the stationary cutter is on the side of the shearing plane adjacent the pivotal axis of said supporting means.

7. A nibbler as described in claim 6 in which said movable cutter is arcuate in shape and of radius less than the distance between the axis of said pivotal supporting means and the shearing plane, the center of curvature of said arcuate cutter being positioned between the shearing edge of the arcuate cutter and said pivotal axis.

LESLIE W. RUSSELL.